Figure 13:
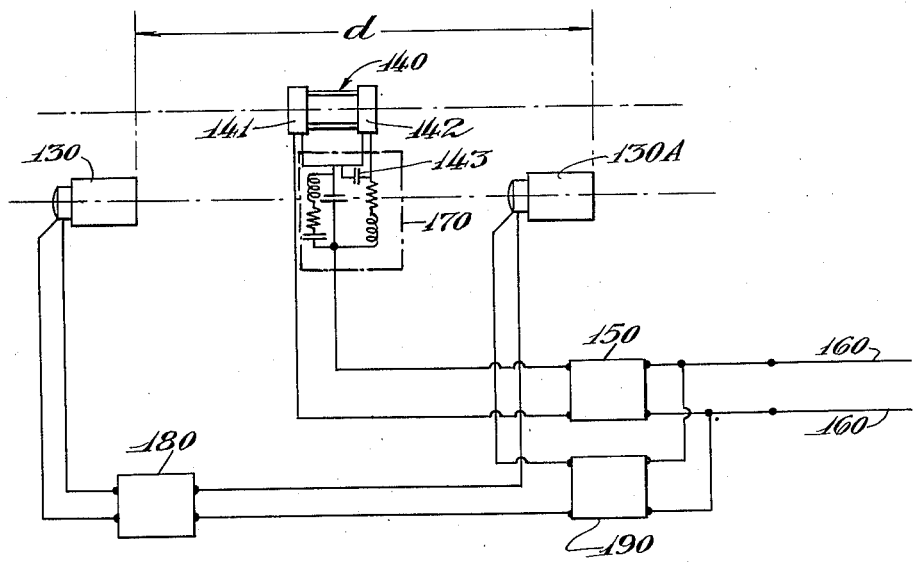

Dec. 22, 1942.   B. B. BAUER   2,305,599
CONVERSION OF WAVE MOTION INTO ELECTRICAL ENERGY
Filed April 8, 1941   4 Sheets-Sheet 1
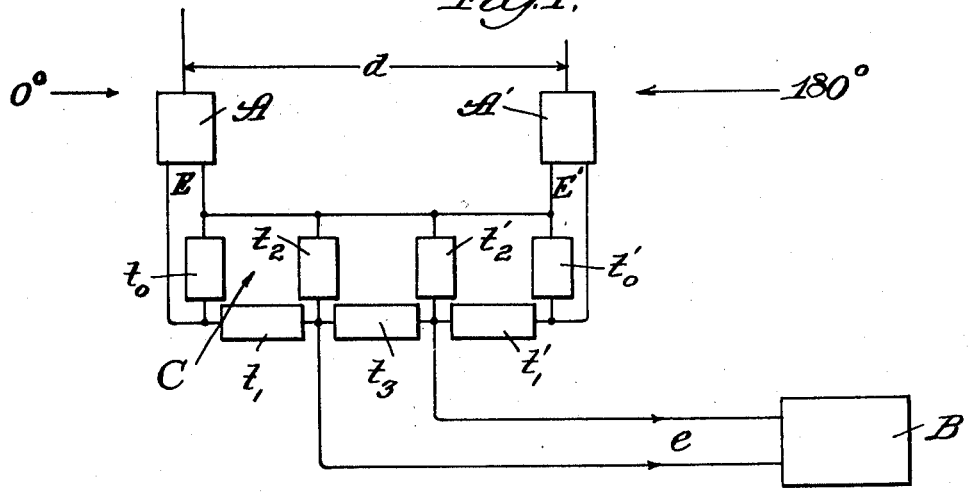
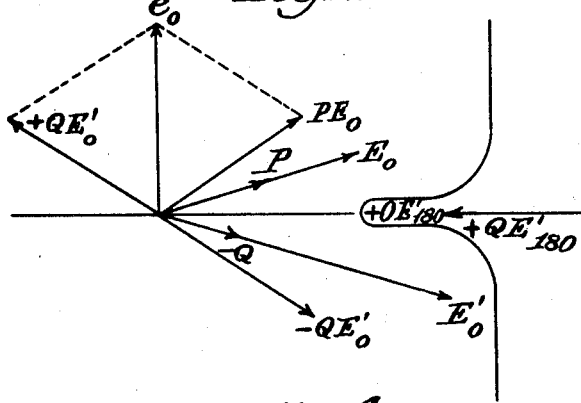
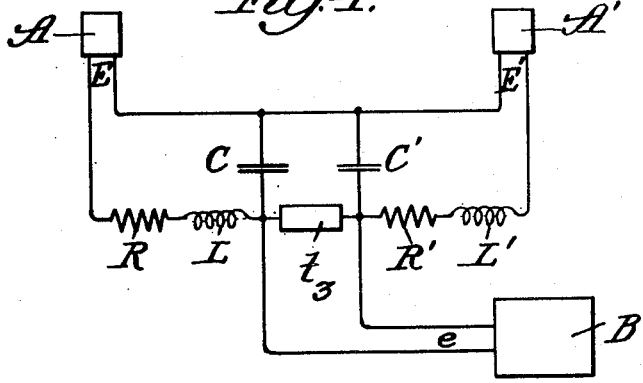
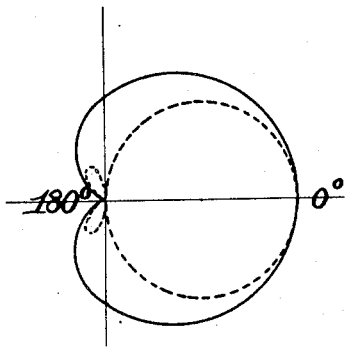
INVENTOR.
Benjamin B. Bauer
BY Dawson, Ooms & Booth
Attorneys.

Dec. 22, 1942.   B. B. BAUER   2,305,599
CONVERSION OF WAVE MOTION INTO ELECTRICAL ENERGY
Filed April 8, 1941   4 Sheets-Sheet 2

Inventor:
Benjamin B. Bauer
By Dawson, Ooms & Booth
Attorneys.

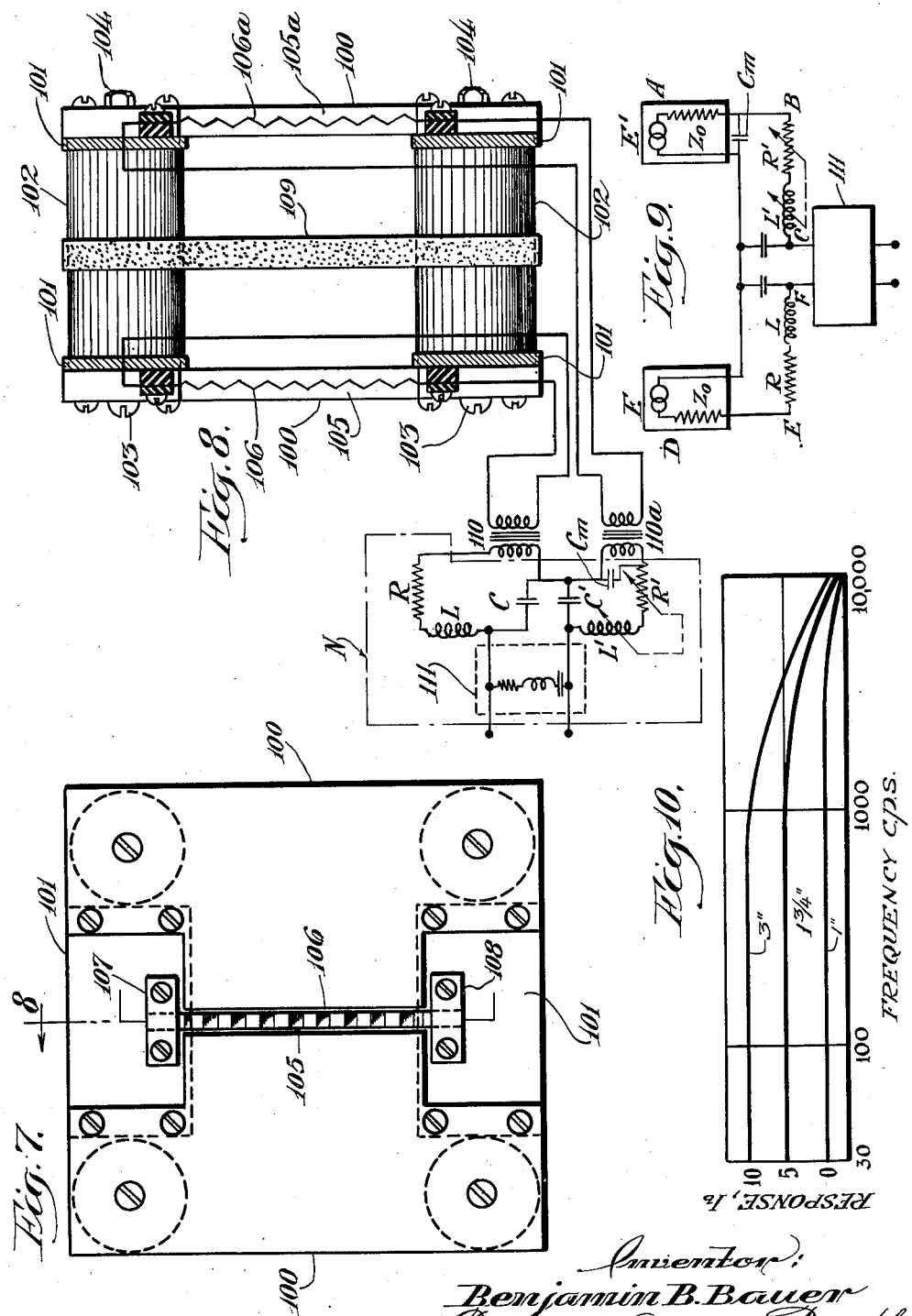

Dec. 22, 1942.  B. B. BAUER  2,305,599
CONVERSION OF WAVE MOTION INTO ELECTRICAL ENERGY
Filed April 8, 1941  4 Sheets-Sheet 4

Inventor:
Benjamin B. Bauer
By Dawson, Ooms & Booth
Attorneys.

Patented Dec. 22, 1942

2,305,599

UNITED STATES PATENT OFFICE 2,305,599

CONVERSION OF WAVE MOTION INTO ELECTRICAL ENERGY

Benjamin B. Bauer, Chicago, Ill., assignor to S. N. Shure and Frances Shure, trustees, doing business as Shure Brothers, a partnership Application April 8, 1941, Serial No. 387,438

23 Claims. (Cl. 179—1)

This invention relates to apparatus for conversion of wave motion into electrical energy and the converse. More particularly it relates to instruments of unidirectional nature, i. e., in which the instrument is active preferentially in one direction only, throughout an extensive range of frequencies, being relatively inoperative in other directions. This application constitutes a continuation-in-part of my co-pending application, Serial No. 232,439 for "Conversion of wave motion into electrical energy, etc.," now Patent No. 2,237,298. Other co-pending applications which are also continuations in part of Serial No. 232,439 are Serial No. 387,215, entitled "Conversion of wave motion into electrical energy, etc.," filed April 7, 1941; Serial No. 387,216, entitled "Conversion of wave motion into electrical energy, etc.," filed April 7, 1941; and Serial No. 387,217, entitled "Conversion of wave motion into electrical energy, etc.," filed April 7, 1941.

Unidirectional operation has previously been obtained in both the transmitting and receiving transducers through a combination of a unit having a nondirectional (circular) polar sensitivity pattern with one having a bidirectional (cosine-law) polar sensitivity pattern. A combination of two such units causes the resulting polar sensitivity pattern to be unidirectional (cardioid) in shape, and it has been applied extensively in the past to transmitting antennas, microphone apparatus, etc. For this latter application, one of the units is commonly made to operate on the pressure component of the sound wave (pressure transducer) and the other upon the pressure-difference of the sound wave (velocity transducer). Addition or cancellation of the voltages generated in each unit occurs depending upon whether the incidence of sound is from the front (0° incidence) or from the rear (180° incidence) of the instrument. Obviously, the voltages generated by both units for the 180° incidence should be substantially equal and opposite in phase throughout the frequency range in which the cancellation is desired, which because of inherent differences in construction and operating principle is a difficult thing to obtain in microphones operating upon dissimilar components of the sound wave.

One important object of my invention is to provide a unidirectional transducer operating over a wide frequency range and comprising in part two transducing elements operating on the same component of the sound wave, thus doing away with the necessity of subtracting outputs of two transducing elements working on dissimilar components of the sound wave.

Another object is to provide a unidirectional transducer with marked unidirectional properties over the operating range of frequencies. Still other objects of my invention will become apparent as this specification proceeds.

Figure 6:
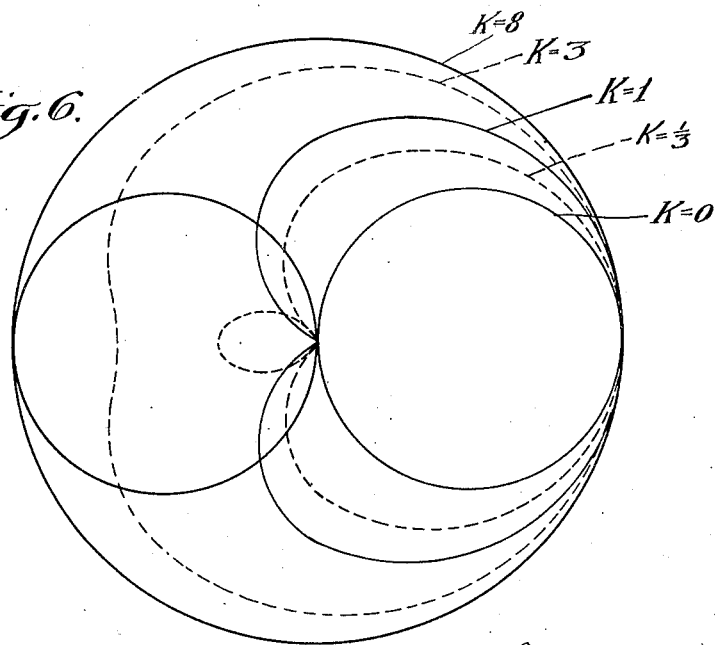
Figure 11:
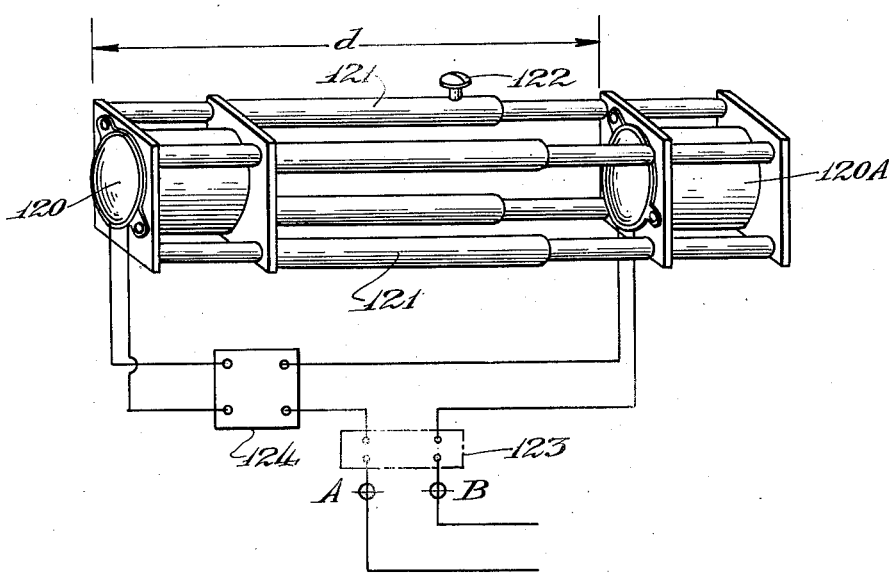
Figure 12:
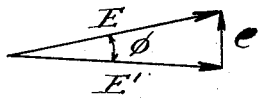

Figure 1 is a diagrammatic layout of generalized apparatus embodying my invention; Fig. 2, a vector diagram showing the voltage relationships for a zero degree incidence of sound; Fig. 3, a similar view to Fig. 2 but representing the 180° incidence of sound; Fig. 4, a diagrammatic view of a specific embodiment comprehended within the diagram of Fig. 1; Fig. 5, a polar diagram illustrating the directional characteristics of the transducers of Figs. 4 and 7; Fig. 6, a polar diagram illustrating further space patterns which may be obtained according to the invention; Fig. 7, a front view in elevation of a microphone employing two pressure difference transducing elements; Fig. 8, a sectional view of the embodiment shown in Fig. 7, and taken as indicated at line 8 of Fig. 7, this Fig. 8 including a schematic diagram of an electrical network for producing unidirectional operation; Fig. 9, an equivalent electrical network of the device illustrated in Figs. 7 and 8; Fig. 10, a graph showing response curves for the microphone of Fig. 7; Fig. 11, another modification of the invention employing two unidirectional transducing elements; Fig. 12, a vector diagram of the voltage relationships in the device illustrated in Fig. 11; and Fig. 13, a schematic representation of a further embodiment employing four moving elements together with their associated networks.

My invention is principally applicable to production and reception of sound waves in air, although it will become apparent to those skilled in the art that it may be equally applicable to wave phenomena in other media. The transducer element or elements employed may be either of the reversible type, such as piezoelectric crystal, moving coil, moving armature or condenser type, or of the non-reversible type such as, for example, the carbon type. The theory set forth herein is applicable to receiving apparatus, such as loudspeakers, as well as to transmitting apparatus such as microphones. If transducers of the reversible type are employed, one instrument could serve interchangeably, both as a transmitter and as a receiver.

The nature of my invention is such that it can be best explained by reference to the following equivalent electrical networks and circuit equations. Fig. 1 is a schematic representation of two electro-acoustic transducers A and A', generating respectively voltages E and E', and the interconnecting electrical network C. The transducers, which may operate on any function of the sound wave whatsoever, are spaced by an effective acoustical distance $d$ which in general should be smaller than, or comparable to, one-quarter wavelength of the highest frequency at which unidirectional action is desired, although it will be shown later that transducers may be constructed having unidirectional properties at frequencies higher than that specified above by virtue of diffraction and other wave effects. C is a generalized network shown in an equivalent $\pi$ section, composed of impedance $Z_0$, $Z_1$, $Z_2$, and $Z_0'$, $Z_1'$, and $Z_2'$. The impedance $Z_3$ is connected to the receiver B which may be an amplifier or any other receiving device. For simplicity, the internal impedances of the transducers A and A' are here considered negligible, although if this is not the case the proper internal impedances should be inserted in the network in carrying out the analysis.

The sound wave is considered as a plane wave which may be incident from any angle $\theta°$ from the normal $0°$ incidence indicated with the corresponding arrow in Fig. 1. The voltage developed by the transducers A and A' is indicated as E and E' respectively. Subscripts $\theta$, 0 and 180 are used to designate voltages developed from any angle of incidence $\theta°$, for normal front ($0°$) or for the rear ($180°$) incidence of sound, respectively. The respective voltages generated by the transducers A and A' will be displaced in phase by an angle given by the equation:

$$\phi_\theta = \frac{\omega d}{C_v} \cos \theta \qquad (I)$$

in which $\phi_\theta$ is the phase angle between the voltages E and E'
$\omega$ is the expression $2\pi f$
$f$ is the frequency, cycles per second
$\theta$ is the angle of incidence of sound
$C_v$ is the velocity of the sound wave.

Applying circuit analysis to the equivalent circuit of Fig. 1, it may be shown that the voltage $e$ delivered to the receiving apparatus, is given by the equation: (II)

$$e = \frac{\left(1+\frac{Z'_1}{Z'_2}\right)E - \left(1+\frac{Z_1}{Z_2}\right)E'}{\frac{Z_1}{Z_3}\left(1+\frac{Z'_1}{Z'_2}\right)+\left(1+\frac{Z_1}{Z_2}\right)\left(1+\frac{Z'_1}{Z'_2}\right)+\frac{Z'_1}{Z_3}\left(1+\frac{Z_1}{Z_2}\right)}$$

It may be shown, furthermore, that the voltage drop across any branch in a network composed of linear elements, due to the action of two sources A and B connected at any two points, may always be expressed as the sum of the partial voltage drops due to each source acting alone. Thus, for the network of Fig. 1, the portion of $e$ due to E can be expressed as PE where P is the coefficient of E in Equation II divided by the denominator, and the portion of $e$ due to E' can be expressed as ZE' where Z is the coefficient of E' in Equation II divided by the denominator. It is seen therefore that the expression for the voltage delivered to the receiving apparatus can be indicated in the form:

$$e = PE + QE' \qquad (III)$$

Any expression involving network elements, having the function of P and Q in Equation III, is herein called the network factor.

To obtain unidirectional action, the voltage $e_{180}$ should become zero. Therefore, the condition to be met is:

$$e_{180} = PE_{180} + QE'_{180} = 0 \qquad (IV)$$

and hence the relation between coefficients P and Q should be such that:

$$-\frac{P}{Q} = \frac{E'_{180}}{E_{180}} \qquad (V)$$

and the nature of the network components is to be chosen to substantially maintain this relation throughout the frequency range in which the unidirectional action is desired.

Equation V is perfectly general and may be applied to any unidirectional transducing system having two generators and an interconnecting network, delivering the translated energy to a receiver. For the particular case of the network of Fig. 1, the values of network factors P and Q specified above may be inserted into, e. g., (V), giving the following relationship to be fulfilled:

$$\frac{1+\frac{Z'_1}{Z'_2}}{1+\frac{Z_1}{Z_2}} = \frac{E'_{180}}{E_{180}} \qquad (VI)$$

Before describing more specific embodiments of my invention, its operation will be further clarified by the following explanation made in reference to Figs. 2 and 3, which are vector diagrams representing the voltage relations for front and rear incidence of sound upon the instrument of Fig. 1.

For the purpose of explanation, it is assumed that voltages E and E', generated by the similar generators A and A', are of unequal magnitudes, although this is not necessarily the case. The voltage $E_0$ is shown leading the voltage $E'_0$ through an angle $\phi$ determined by Equation I, while the voltage $E_{180}$ is shown lagging behind $E'_{180}$ by the same angle, since reversal of the direction of incidence brings about reversal of the relative phase positions of the generated voltages. The network factors P and $-Q$ are shown of the same relative magnitudes and angular position as the rear ($180°$) incidence voltages $E'_{180}$ and $E_{180}$ respectively, as specified by Equation V.

The $0°$ (front-incidence) condition is shown in Fig. 2. The voltage $E_0$ is operated upon the vector P to give the vector $PE_0$ which is the contribution of the generator A to the total output voltage. The voltage $E'_0$ is operated upon by vector $-Q$ giving the vector $-QE_0$ which is the contribution of the generator A' to the total output voltage. $QE'_0$ is added to $PE_0$ giving the resultant output voltage $e_0$.

The ($180°$) rear incidence condition is shown in Fig. 3. The voltage $E_{180}$ is operated upon by the vector P giving the vector $PE_{180}$ which is the contribution of the generator A to the total output voltage. The voltage $E'_{180}$ is operated upon by the vector $-Q$ giving the vector $-QE'_{180}$ which is the contribution of the generator A' to the total output voltage. It should be noticed that for the rear incidence condition, the voltages $PE_{180}$ and $QE'_{180}$ are out of phase and of equal magnitude, and hence when the latter is added to the former, the resulting total output voltage is zero.

A specific example of network selection will be given in reference to Fig. 4. This network is the same as that of Fig. 1, with the following element values:

$$Z_0 = \infty$$

$$Z'_0 = \infty$$

$$Z_1 = R + j\omega L$$

$$Z_2 = \frac{1}{j\omega c}$$   (VII)

$$Z'_1 = R' - j\omega L'$$

$$Z'_2 = \frac{1}{j\omega c'}$$

It will be assumed here that the voltages E and E' are two vectors of equal magnitude and displaced by an angle $\phi$ whose value is determined from Equation I, their ratio being therefore equal to a unit vector at the angle $\phi$. Substituting this value of angle into the right hand side of Equation VI, and that of the network elements of (VII) into the left hand side of Equation VI, it is evident that the desired relationship is $$\frac{1 - \omega^2 L'C' + j\omega C'R'}{1 - \omega^2 LC + j\omega CR} = \left|\frac{\omega d}{C_v}\right|$$   (VIII)

The left hand member of the Equation VIII represents a quotient of two vectors, each of which may be made very nearly a vector operating at an angle proportional to frequency, if the relationship between resistance, inductance and capacitance is such that:

$$L = \frac{CR^2}{2} \text{ and } L' = \frac{C'R'^2}{2}$$   (IX)

since substituting these values into Equation IX gives the following relation:

$$\left|\frac{\omega d}{C_v}\right| = \frac{1 - \frac{\omega^2 C'^2 R'^2}{2} + j\omega C'R'}{1 - \frac{\omega^2 C^2 R^2}{2} + j\omega CR}$$   (X)

It should be observed that the numerator and the denominator of Equation X are the major terms of the expansion for the cosine and the sine functions: hence, as long as:

$$\omega C'R' \ll 1 \text{ and } \omega CR \ll 1$$   (XI)

The Equation X may be rewritten:

$$\left|\frac{\omega d}{C_v}\right| = \frac{\cos \omega C'R' + j \sin \omega C'R'}{\cos \omega CR + j \sin \omega CR} = \cos \omega(R'C' - CR) +$$

$$j \sin \omega(C'R' - CR) = |\omega(C'R' - CR)|$$   (XII)

The frequency term $\omega$ drops out of this equation, and therefore the condition for unidirectivity will be obtained if $$\frac{d}{C_v} = R'C' - RC$$   (XIII)

The distance $d$ and the velocity of sound $C_v$ being known, R, R', C, and C' may be selected by the use of Equation XIII. Then values of L and L' may be computed from Equation IX. Since the Equation XII holds as long as the expressions XI are true, then by choice of sufficiently small distance $d$, unidirectional action may be obtained throughout a wide range of frequencies. I have found that Equation XII is valid up to frequencies at which $d$ is not larger than one-quarter the wavelength of sound; thus, if $d$ is equal to approximately 1.5 cm., unidirectional action is obtained for all frequencies up to approximately 5,000 cycles per second.

The type of polar directivity pattern obtained with the use of my invention depends upon the operational principle of the transducers A and A'. This may be shown by solving the Equation V for Q and substituting into Equation III, which gives:

$$e = P\left(E - \frac{E_{180}}{E'_{180}} E'\right) = \left(\frac{E'}{E} - \frac{E_{180}}{E'_{180}}\right)$$   (XIV)

Since A and A' are similar generators, the ratio of voltages E and E' will be a vector K having constant magnitude and acting at the angle $\phi_0$; therefore, the ratio of $E_{180}$ and $E'_{180}$ will be a vector K at an angle $\phi_{180}$; therefore:

$$e = PE'(K|\phi_0 - K|\phi_{180}) = PE'K(|\phi_0 - |\phi_{180})$$   (XV)

The expression in parenthesis of Equation XV, at frequencies for which $d$ is small compared to one-quarter wavelength of sound, may be shown to approximately equal the algebraic sum of the angles $\phi_0$ and $\phi_{180}$. Substituting the values of these angles given by Equation I, $$e = PE'K\frac{\omega d}{C_v}(1 + \cos \theta)$$   (XVI)

If the character of the transducers A and A' is such that the voltage generated is independent of the incidence of sound (pressure-operated or non-directional transducers), the polar characteristic of the combination will be a cardioid of revolution expressed by the quantity in parenthesis in Equation XVI. This polar characteristic is shown graphically in solid line in Fig. 5.

If the voltage E and E' varies as the cosine of the angle of incidence, which will occur if transducers are of the bidirectional or "velocity-type," then $E' = E'_0 \cos \theta$ and:

$$e = PE'_0 K\frac{\omega d}{C_v}[\cos\theta(1 - \cos\theta)]$$   (XVII)

The quantity in brackets of Equation XVI represents the polar characteristic shown graphically in dotted lines in Fig. 5. It is seen, therefore, that combining two velocity type transducers and the network described results in an electroacoustic transducing instrument of very marked unidirectional properties. It will be observed that my invention may make use of any two transducers operating on the same wave function, even if their transducing principles were dissimilar. Marked unidirectional response is also obtained by the use of two unidirectional transducers.

Instead of providing the electrical network directly at the output of the transducers, it is possible to first amplify these outputs with two independent amplifiers and combine the outputs after the amplification. This procedure would be considered of the nature of an equivalent.

In Equation XII the left hand side, $\omega d/C_v$, represents the phase difference between E and E' which results from the time required for the sound wave to travel the distance $d$. The right hand side, $\omega(C'R' - CR)$, represents the difference between the phase shift the electrical waves from one moving element experience in passing through the electrical network associated with this moving element and the phase shift the electrical waves from the other moving element experience in passing through the electrical network associated with this other moving element. If we define the quantity $k$ as $(C'R' - CR) C_v/d$, that is, as the ratio of this difference to the phase difference between E' and E, then the resulting wave energy delivered, $r$, in polar coordinates, and in terms of the angle of sound incidence, $\theta$, for the circuit of Fig. 4 in the special case in which A and A' are nondirectional is given approximately by: $r = p(K + \cos \theta)$, where $p$ is proportional to the maximum pressure of the sound wave. This is the equation of the limaçon. By substituting the values of C', R' C and R in the expression for $k$ and using this value of $k$ in the equation of the limaçon, the variation in directional response with different network characteristics may be determined. Refinements obtained when L' and L are also varied are discussed below.

The response is zero for the values of $\theta$ which make $\cos \theta = -k$. When $k$ equals one, that is, when Equation XIII holds, a cardioid directional pattern results. The value of $\cos \theta$ then equals $-1$ when $\theta$ equals 180° and there is no response from the rear of the microphone. This is the directional characteristic usually desired and the one to which I have given detailed consideration above. A plot of some of the other directional characteristics the microphone is capable of giving are shown in Fig. 6. As $k$ is made less than one, the microphone maintains its unidirectional property, or preferential response to sound of 0° incidence, but a minor lobe corresponding to diminished response to sound of rear incidence occurs. The two angles of zero response, which may be thought of as being coincident for the special case of $k$ equals one, are symmetrically disposed with respect to 180° in the second and third quadrants. In the limit when $k$ equals zero, that is, when R'C' equals RC, the null angles are 90° and 270° and the microphone becomes a cosine bidirectional type.

The polar pattern shown in Fig. 6 represents the response of the instrument in a plane through the principal axis of the microphone. The surface of revolution generated by rotating the curve about this axis represents the three dimensional response of the device. From this we note that when $k$ equals 1, the response is zero on the principal axis for sound of 180° incidence. As $k$ is reduced the surface in which zero response occurs is a conical one, the internal solid angle of which increases as $k$ is reduced until in the limit when $k$ equals zero the surface becomes the plane of zero response in the resulting cosine bidirectional microphone. As the value of $k$ is made to exceed one, the surface of zero response disappears although the microphone retains its unidirectional property until the limiting value of infinity is reached at which the microphone becomes nondirectional.

An embodiment of my invention is shown in front elevation in Fig. 7 and in cross section in Fig. 8. This embodiment employs four soft iron pole pieces designated by the character 100. These pole pieces are held together by means of four non-magnetic plates 101 made of brass, aluminum, or other non-magnetic material, and by means of four bar magnets 102 secured to the pole pieces by screws 103 and nuts 104. The complete assembly comprising pole pieces, supporting plates, magnets and screws, forms a magnetic structure with two air gaps 105 and 105A. These two air gaps need not be interconnected magnetically, and each may be provided with its own magnet if so desired. Within the air gaps 105 and 105A are two thin and flexible conducting ribbons 106 and 106A respectively. These ribbons are held in place by means of insulated terminal plates 107 and 108 located between the front and rear pole pieces respectively. The ribbons are so held as to be free to vibrate to and fro between the pole pieces.

Each pair of pole pieces forming the air gaps 105 and 105A is freely exposed to the sound waves from all sides, except as this freedom may be impeded by the reaction of one pair of pole pieces upon the other. This interaction is quite negligible at low frequencies. However, in order to minimize this reaction at the high frequencies and prevent standing waves from being set up between the two pairs of pole pieces, I prefer to provide a sound absorbing pad 109, made of felt or some equivalent material, between the two pairs of pole pieces in such a manner that it absorbs the high frequency standing waves and minimizes other disturbances which are generated between the two pairs of pole pieces. Alternately, the space between the two pairs of pole pieces may be filled with loosely packed wool, felt, or other sound absorbing material.

Each of the two ribbons 106 and 106A is freely exposed to sound pressure on both of its sides and is therefore capable of acting as a velocity microphone. These two ribbon elements are connected to the electrical network N (see Fig. 8) by means of the two impedance matching transformers 110 and 110A. The network N, in its simplest form, consists of a resistor R', an inductance L', and a condenser C'.

For convenience in altering the characteristics of this instrument, these elements may be adjustable, and I have shown the resistance R' and the inductance L' adjustable so that the directional pattern of the microphone may be altered. The elements L, R, and C, and L', R', and C', are adjusted in such a manner that the left hand side of Equation VIII is proportional to frequency, the constant of proportionality being $k$, as previously defined in this specification. In order that this relation should be fulfilled, and in order that the adjustment be made with motion of only one adjusting member, the variable inductance and resistance which provide L' and R' may be coupled together. In addition, the inductance L' should vary as a linear function and R' should vary as the square function; and to accomplish this I prefer to couple a variometer in which the inductance varies linearly with angular rotation of the shaft, to a rheostat in which the resistance is proportional to the square of the shaft rotation. Mechanical coupling elements such as cams, levers, and the like also may be used to produce the desired relative variation in L' and R'.

With such an arrangement of L' and R', and with a properly chosen capacitance C, the left hand side of Equation VIII will be proportional to frequency for substantial changes in the constant of proportionality, and the microphone will present a uniform directional characteristic at all frequencies where the wave length is considerably larger than the dimensions of the instrument.

The equivalent electrical circuit of this instrument is shown in Fig. 9. Each transducer and its associated transformer may be represented by the voltage E and E', respectively, acting through an impedance $Z_0$. The impedance $Z_0$ will, in general, be very nearly a resistance $R_0$, and the value of R' in Equation IX must therefore be corrected by subtracting from it the value of $R_0$. The total effective resistance in the branch ABC of Fig. 9 will then equal R', as required by Equation IX. An equivalent allowance for the effective internal resistance of the other transducer must also be made in choosing R.

When the instrument has been constructed in this manner and the quantity $(R'C'-RC)$ is adjusted to equal $d/C_v$, as in Equation XIII, where $d$ is the effective acoustical distance between the two pairs of pole pieces, the microphone will have a directional pattern expressible by the Equation $P(1+\cos \theta) \cos \theta$, where P is proportional to the sound pressure. It is understood that by varying R' and L' and/or R and L, other directional characteristics may be obtained, such as may be expressed by the equation $P(k+\cos \theta) \cos \theta$, where $k$ may have any positive real value. When $k=0$, the directional characteristic is proportional to $\cos^2 \theta$; when $k$ is infinite, the microphone is non-directional.

Each of the two transducers formed by the paired pole pieces 101 and ribbons 106 constitutes a velocity type transducer, and therefore its output voltage for constant sound pressure in a plane sound wave is substantially independent of frequency within the frequency range where a half wave length of sound is larger than the dimensions of the instrument. For example, if the largest dimension of the instrument is approximately one inch, the frequency response of each ribbon unit may be represented by the curve labeled 1'' in Fig. 10. Under such circumstances, the microphone will have the directional pattern as expressed by the equation given above within practically all of the audible frequency range. However, the output of the microphone will be, under such circumstances, rather low. By increasing the dimensions of the instrument, the output of the microphone may be considerably increased, as shown in Fig. 10. For example, by increasing the size of the unit to approximately 1¾ inches, the level may be increased by approximately 5 db., and if the unit is made approximately 3 inches in size, the level may be increased by a total of 10 db. However, when this is done, the frequency response tends to suffer.

To overcome the undesirable effect on the frequency response when the dimensions of the instrument are enlarged, I prefer to provide a frequency corrective network 111 which is designed to decrease the high frequency response up to a certain frequency, and increase it thereafter. Up to the frequency where half the wave length of sound equals the shortest air path between the sides of the ribbon, the directional pattern is given by the equation $(k+\cos \theta) \cos \theta$. At higher frequencies the phase shifting network becomes inoperative, and it principally serves to eliminate or reduce the effect of the ribbon 106A. This effect is augmented by the condenser $C_m$ which becomes effective when this frequency is reached. However, the ribbon 106 remains operative and the microphone largely retains its directional properties because the rear pair of pole pieces and the pad 109 reduce the sound pressure on the ribbon 106 for sound of rear incidence.

By using an instrument 3 inches square and provided with the network described, I can obtain an output over a wide frequency range which is fully comparable with the output obtained from other commercial microphones, and in addition, obtain the directional pattern shown dotted in Fig. 5. This directional pattern is very desirable in most applications requiring unidirectional response.

Another embodiment of my invention is shown in Fig. 11. In this embodiment, I prefer to use two unidirectional microphone units which may be similar to the unit shown in Fig. 10 of my copending application Serial No. 232,439. In Fig. 11 of the drawings in the present application are shown two such transducers 120 and 120A which are mechanically connected by four telescoped members 121 each of which consists of a rod sliding in a tube. The ends of the tubes are attached to one of the transducers and the rods to the other transducer. The distance $d$ between the two corresponding points of the transducers may be adjusted by sliding the rods in and out of the tubes and then fastening them in place by means of the screw 122. The two transducers are connected electrically in opposition, so that the output voltages of the two transducers subtract.

Fig. 12 shows a vector diagram indicating the output voltage at the terminals of the two transducers. In Fig. 12, E represents the voltage output of the transducer 120 and E' represents the voltage output of the transducer 120A. The arrow joining the ends of E' and E represents the voltage $e$ at the terminals A and B. The voltages E and E' are separated in phase by an angle $\phi$ equal to $$\left(\frac{\omega d}{C_v}\right) \cos \theta$$

It may be shown that, at frequencies where the wave length of sound is considerably longer than the distance $d$, $e=E \sin \phi$ which is approximately equal to $E\phi$ or to $$E\left(\frac{\omega y}{C_v}\right) \cos \theta$$

for small values of $\phi$. It will be remembered that the transducers 120 and 120A are constructed so that they are preferentially sensitive to sound waves coming from one direction.

In one particular embodiment the polar characteristic of these transducers has been made equal to a limaçon of revolution whose polar pattern is given by the equation $(k+\cos \theta)$.

By simply subtracting the output voltages of two such unidirectional microphones, and separating the units by a distance $d$, my invention enables me to obtain a microphone having a higher order of directivity.

In some instances I have found it useful to interpose in series with one of the units a low pass filter 124. Such filters are well known in the art and therefore will not be described here in detail. However, by placing the upper cut-off frequency of this filter at approximately the frequency where the distance $d$ equals ½ the wave length of sound, the operation of the instrument may be improved, since the out-of-phase voltage of the left hand unit is eliminated at high frequencies. In some instances the phase shift occasioned in the filter at or about the cut-off point may be used to extend somewhat the frequency range of the unit. This is accomplished by producing a phase delay which has the same effect as moving the front microphone rearwardly for sound of 0° incidence.

Though not essential to the efficient operation of this embodiment I sometimes prefer to employ a phase shifting network, here also designated 124, for adjusting the relative phases of the waves delivered to the line from the two transducers. Such a network is advantageous in that it permits adjustment for various kinds of polar patterns.

Fig. 13 shows another embodiment of the invention which in some respects is a combination of the unit of Figs. 7 to 9 and the unit of Fig. 11. This improved construction has a very desirable frequency range and output level. The two units 130 and 130A are spaced by a considerable distance, say approximately 12 inches or more. Under such circumstances, the units will be operative up to a frequency of approximately 500 cycles per second. The microphone 140 is preferably small, having an overall dimension of approximately one inch, and therefore having a frequency range extending to approximately 10,000 cycles per second. Microphone 140 comprises two moving elements designated 141 and 142 which are adapted to convert their movements into electrical wave energy. These elements are electrically connected through the high pass filter 150 to the output line 160. An electrical network 170 is interposed for effecting the desired phase shift in the electrical waves coming from the element 142 with respect to the waves delivered to the line from the element 141. Included is a condenser 143 which is relatively small and becomes effective only at substantially higher frequencies than the lowest frequencies passed by the filter 150, for example, approximately 500 cycles per second. This condenser operates upon the same principle as the condenser Cm of Figures 8 and 9.

The electrical waves from one of the transducers 130 and 130A may be passed through a phase shifting electrical network 180, and the combined wave of transducers 130 and 130A passed through the low pass filter 190 which may permit the passage of frequencies below 500 cycles per second, for example. The outputs of the two filters 150 and 190 are combined into a single output delivered to the line 160.

From the foregoing it will be apparent that at frequencies below 500 cycles per second, for example, electrical waves will be transmitted from transducers 130 and 130A but not from the microphone 140; and at frequencies in the range above this limit electrical waves will be transmitted from the microphone 140 but not from the transducers 130 and 130A. The phase shifting electrical networks in each case operate to create the desired shifts in phase as before explained. As in the embodiments before described, the phase shifting networks with respect to both transducers 130 and 130A and the microphone 140 may be adjusted to alter the extent of the phase shift, thus to allow various directional patterns to be obtained. As a further feature, at extremely high frequencies, of the order of 8,000 cycles per second, the condenser 143 becomes operative so as to diminish the effect of the element 142. Thus, there is provided a system which gives good directional properties and frequency response covering all of the required frequency range.

While in the foregoing description several embodiments of the invention have been described in detail, it is understood that many other embodiments may be constructed which differ greatly from the specific ones herein given, all within the spirit of the invention.

I claim:

1. In a sound translating device, a pair of moving bodies separated by an acoustical distance, each of said bodies being adapted to vibrate in response to sound waves and transmit its vibrations into electrical waves, and means for transmitting the electrical waves from said bodies to a line leading from said device, said means including a phase shifting electrical network transmitting the electrical waves from one of said bodies, said network being effective to shift the phase through an angle which is proportional to the frequency of said waves over a substantial range of frequencies.

2. In a sound translating device, a pair of moving bodies separated by an acoustical distance each adapted to vibrate in response to sound waves and transmit its vibrations into electrical waves, and means for transmitting the electrical waves from said bodies to a line leading from said device, said means including a phase shifting electrical network transmitting the electrical waves from one of said bodies, said network being effective to shift the phase to a degree such that the difference between the phase of said waves from said one body and the phase of the waves transmitted from said other body bears a constant ratio to the phase change due to said waves traveling said acoustical distance.

3. In a sound translating device, a pair of moving bodies separated by an acoustical distance each adapted to vibrate in response to sound waves and transmit its vibrations into electrical waves, and means for transmitting the electrical waves from said bodies to a line leading from said device, said means including a phase shifting electrical network transmitting the electrical waves from one of said bodies and effective to shift the phase through an angle which is proportional to frequency, and including also a second electrical network transmitting the electrical waves from the other of said bodies and effective to shift the phase through an angle which is proportional to frequency, said networks having such relation that the difference in the phase shifts they produce bears a constant ratio to the phase change due to said waves traveling said acoustical distance.

4. A device as set forth in claim 2 in which said constant ratio is substantially unity.

5. A device as set forth in claim 2 including means for adjusting said network to change said ratio.

6. A device as set forth in claim 2 including means for adjusting said network to change said ratio, said means including a single manual control member.

7. A device as set forth in claim 2 in which said network includes a resistance and inductance, and including means for adjusting said network to change said ratio, said means including a movable element operable to change said resistance as the square of said inductance.

8. In a sound translating system, a pair of transducers having unidirectional characteristics, each of said transducers being responsive to sound waves and adapted to deliver electric waves corresponding to said sound waves, an electrical line leading from said system, and means for transmitting electrical waves from each of said transducers to said line.

9. In a sound translating system, a pair of transducers having unidirectional characteristics, each responsive to sound waves and adapted to deliver electric waves corresponding to said sound waves, and means for transmitting electrical waves from said transducers including an electrical network transmitting electrical waves from one of said transducers, said network being effective to shift the phase through an angle which is proportional to frequency.

10. In a sound translating system, a pair of transducers having unidirectional characteristics and arranged to be preferentially sensitive to sounds of the same direction, each of said transducers being adapted to deliver electrical waves corresponding to said sound waves, an electrical line leading from said system, and means for transmitting electrical waves from each of said transducers to said line.

11. In a sound translating system, a pair of transducers having unidirectional characteristics, each of said transducers being responsive to sound waves and adapted to deliver electric waves corresponding to said sound waves, an electrical line leading from said system, and means for combining and transmitting the combined waves of said transducers to said line, said means being adapted to combine said waves in subtractive relation.

12. In a sound translating system, a pair of transducers separated by an acoustical distance, each of said transducers being responsive to sound waves and adapted to deliver electrical waves corresponding to said sound waves, means for transmitting the electrical waves from said transducers to a line leading from said system, said means including phase shifting means whereby the phase of said waves coming from one of said transducers is shifted with respect to the ways transmitted from said other transducer such that said phase shift bears a constant ratio to the phase change due to said waves traveling said distance, and means for adjusting said distance.

13. A system as set forth in claim 12 in which said last-mentioned means includes a set of telescoped spacing members.

14. In a sound translating device, a pair of moving bodies separated by an acoustical distance, each of said bodies being adapted to vibrate in response to sound waves and transmit its vibrations into electrical waves from said bodies to a line leading from said device, said means including a phase shifting electrical network transmitting the electrical waves from one of said bodies, said network being effective to shift the phase through an angle which is proportional to the frequency of said waves over a substantial range of frequencies, said network being of such character as to restrict transmission of waves from said one body at the higher sound frequencies.

15. In a sound translating system, a pair of moving bodies separated by an acoustical distance, each of said bodies adapted to vibrate in response to sound waves and transmit its vibrations into electrical waves, a pair of transducers having unidirectional characteristics, each of said transducers being responsive to sound waves and adapted to deliver electrical waves corresponding to said sound waves, said transducers being separated by an acoustical distance greater than said acoustical distance, an electrical line leading from said system, and means for transmitting electrical waves from each of said bodies and from each of said transducers to said line.

16. In a sound translating system, a pair of moving bodies separated by an acoustical distance, each of said bodies adapted to vibrate in response to sound waves and transmit its vibrations into electrical waves, a pair of transducers having unidirectional characteristics, each of said transducers being responsive to sound waves and adapted to deliver electrical waves corresponding to said sound waves, said transducers being separated by an acoustical distance greater than said acoustical distance, an electrical line leading from said system, and means for transmitting electrical waves from each of said bodies and from each of said transducers to said line, said means including an electrical network effective to shift the phase of electrical waves from one of said bodies.

17. In a sound translating system, a pair of moving bodies separated by an acoustical distance, each of said bodies adapted to vibrate in response to sound waves and transmit its vibrations into electrical waves, a pair of transducers having unidirectional characteristics, each of said transducers being responsive to sound waves and adapted to deliver electrical waves corresponding to said sound waves, said transducers being separated by an acoustical distance greater than said acoustical distance, an electrical line leading from said system, and means for transmitting electrical waves from each of said bodies and from each of said transducers to said line, said means including electrical network means for shifting the phase of electrical waves from one of said bodies and for shifting the phase of electrical waves from one of said transducers.

18. In a sound translating system, a pair of moving bodies separated by an acoustical distance, each of said bodies adapted to vibrate in response to sound waves and transmit its vibrations into electrical waves, a pair of transducers having unidirectional characteristics, each of said transducers being responsive to sound waves and adapted to deliver electrical waves corresponding to said sound waves, said transducers being separated by an acoustical distance greater than said acoustical distance, an electrical line leading from said system, and means for transmitting electrical waves from each of said bodies and from each of said transducers to said line, said means including electrical network means for shifting the phase of electrical waves from one of said bodies with respect to the electrical waves delivered from said other body, said phase shift bearing a constant ratio to the phase change taking place due to said waves traveling said first-mentioned acoustical distance, said means including also a second electrical network means for shifting the phase of electrical waves from one of said transducers with respect to the electrical waves delivered from said other transducer, said phase shift with respect to said transducers bearing a constant ratio to the phase change taking place due to said waves traveling said second acoustical distance.

19. In a sound translating device, a frame, means in said frame providing a pair of magnetic gaps, means including absorbent material between said gaps for preventing magnetic interaction between said gaps, a pair of moving bodies each within one of said gaps and adapted to vibrate in response to sound waves and translate its vibrations into electrical waves, an electrical line leading from said device, and means for transmitting electrical waves from said bodies to said line.

20. In a sound translating system, a pair of moving bodies separated by an acoustical distance, each of said bodies adapted to vibrate in response to sound waves and transmit its vibrations into electrical waves, a pair of transducers having unidirectional characteristics, each of said transducers being responsive to sound waves and adapted to deliver electrical waves corresponding to said sound waves, said transducers being separated by a second acoustical distance greater than said acoustical distance, an electrical line leading from said system, and means for transmitting electrical waves from each of said bodies and from each of said transducers to said line, said means including a low pass filter through which the electrical waves from said transducers must pass and a high pass filter through which electrical waves from said bodies must pass.

21. In a sound translating system, a pair of moving bodies separated by an acoustical distance, each of said bodies adapted to vibrate in response to sound waves and transmit its vibrations into electrical waves, a pair of transducers having unidirectional characteristics, each of said transducers being responsive to sound waves and adapted to deliver electrical waves corresponding to said sound waves, said transducers being separated by a second acoustical distance greater than said acoustical distance, an electrical line leading from said system, and means for transmitting electrical waves from each of said bodies and from each of said transducers to said line, said means including a low pass filter through which the electrical waves from said transducers must pass and a high pass filter through which electrical waves from said bodies must pass, said means including also electrical network means for substantially eliminating transmission of electrical wave energy from one of said bodies at a frequency substantially above the minimum frequencies passed by said high pass filter.

22. In a sound translating system, a pair of moving bodies separated by an acoustical distance, each of said bodies adapted to vibrate in response to sound waves and transmit its vibrations into electrical waves, a pair of transducers responsive to sound waves and adapted to deliver electrical waves corresponding to said sound waves, said transducers being separated by a second acoustical distance greater than said acoustical distance, an electrical line leading from said system, and means for transmitting electrical waves from each of said bodies and from each of said transducers to said line.

23. In a sound translating system, a pair of moving bodies separated by an acoustical distance, each of said bodies adapted to vibrate in response to sound waves and transmit its vibrations into electrical waves, a pair of transducers responsive to sound waves and adapted to deliver electrical waves corresponding to said sound waves, said transducers being separated by a second acoustical distance greater than said acoustical distance, an electrical line leading from said system, and means for transmitting electrical waves from each of said bodies and from each of said transducers to said line, said means including a low pass filter through which the electrical waves from said transducers must pass and a high pass filter through which electrical waves from said bodies must pass, said means including also electrical network means for shifting the phase of electrical waves from one of said transducers with respect to the electrical waves delivered from the other of said transducers, said means including also electrical network means for shifting the phase of electrical waves from one of said bodies with respect to the electrical waves delivered from the other of said bodies, and means for adjusting said networks to change the extent of the phase shift effected by each.

BENJAMIN B. BAUER.

Certificate of Correction

Patent No. 2,305,599.　　　　　　　　　　　　　　　　　　December 22, 1942.

BENJAMIN B. BAUER

It is hereby certified that errors appear in the printed specification of the above numbered patent requiring correction as follows: Page 2, second column, line 53, for "$E_4$" read $E_0$; page 5, first column, line 31, for "cimcumstances" read *circumstances*; and second column, line 30, for "$E\left(\frac{\omega y}{C_v}\right)$" read $E\left(\frac{\omega d}{C_v}\right)$; and that the said Letters Patent should be read with these corrections therein that the same may conform to the record of the case in the Patent Office.

Signed and sealed this 23rd day of February, A. D. 1943.

[SEAL]

HENRY VAN ARSDALE,
*Acting Commissioner of Patents.*